(12) United States Patent
Park et al.

(10) Patent No.: US 10,553,887 B2
(45) Date of Patent: Feb. 4, 2020

(54) FUEL CELL SYSTEM, VEHICLE HAVING THE SAME, AND CONTROL METHOD OF THE FUEL CELL SYSTEM

(71) Applicant: Hyundai Motor Company, Seoul (KR)

(72) Inventors: GunHyung Park, Busan (KR); JunYoung Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 658 days.

(21) Appl. No.: 15/261,377

(22) Filed: Sep. 9, 2016

(65) Prior Publication Data
US 2017/0301933 A1 Oct. 19, 2017

(30) Foreign Application Priority Data
Apr. 15, 2016 (KR) .......................... 10-2016-0046248

(51) Int. Cl.
| | | |
|---|---|---|
| *H01M 8/04746* | (2016.01) | |
| *H01M 8/04089* | (2016.01) | |
| *H01M 8/0438* | (2016.01) | |
| *B60L 50/51* | (2019.01) | |
| *B60L 58/30* | (2019.01) | |

(52) U.S. Cl.
CPC ......... *H01M 8/04753* (2013.01); *B60L 50/51* (2019.02); *B60L 58/30* (2019.02); *H01M 8/04089* (2013.01); *H01M 8/04388* (2013.01); *B60L 2210/40* (2013.01); *B60L 2260/42* (2013.01); *H01M 2250/20* (2013.01);
(Continued)

(58) Field of Classification Search
CPC ......... H01M 8/04753; H01M 8/04089; H01M 8/04388; B60L 60/50; B60L 58/30; B60L 2210/40; B60L 2260/42
See application file for complete search history.

(56) References Cited

U.S. PATENT DOCUMENTS

| 2005/0118468 A1* | 6/2005 | Adams | H01M 8/04194 429/410 |
| 2005/0181246 A1* | 8/2005 | Nakaji | B60L 58/34 429/429 |

(Continued)

FOREIGN PATENT DOCUMENTS

| JP | 2005-044708 A | 2/2005 |
| JP | 2007-231929 A | 9/2007 |

(Continued)

*Primary Examiner* — Abdullah A Riyami
*Assistant Examiner* — Nader J Alhawamdeh
(74) *Attorney, Agent, or Firm* — Mintz Levin Cohn Ferris Glovsky and Popeo, P.C.; Peter F. Corless

(57) ABSTRACT

A fuel cell system of controlling a valve assembly to maintain a feed flow rate while avoiding a vibration generation range in order to reduce noise due to vibrations generated in the valve assembly is provided. The fuel cell system includes a fuel cell stack that receives fuel and generates electric energy and a valve assembly that adjusts a flow rate of fuel that is supplied to the fuel cell stack. A controller then oscillates the flow rate of the fuel to alternately have a first value that is equal to or greater than a upper limit value of a first vibration generation range and a second value that is equal to or less than a lower limit value of the first vibration generation range, in response to determining that the flow rate of the fuel supplied through the valve assembly is included in the first vibration generation range.

19 Claims, 17 Drawing Sheets

(52) U.S. Cl.
CPC ............ *Y02T 10/7241* (2013.01); *Y02T 90/32* (2013.01); *Y02T 90/34* (2013.01)

(56) References Cited

U.S. PATENT DOCUMENTS

| | | | | |
|---|---|---|---|---|
| 2014/0093796 A1* | 4/2014 | Aoki | ................ | H01M 8/04723 |
| | | | | 429/413 |
| 2015/0037701 A1* | 2/2015 | Asai | ................ | H01M 8/04089 |
| | | | | 429/444 |
| 2016/0141645 A1* | 5/2016 | Yamada | ............ | H01M 8/04029 |
| | | | | 429/436 |
| 2017/0301933 A1* | 10/2017 | Park | ................ | H01M 8/04388 |
| 2017/0305295 A1* | 10/2017 | Park | .................... | B60L 11/1883 |

FOREIGN PATENT DOCUMENTS

| | | |
|---|---|---|
| JP | 2009-016068 A | 1/2009 |
| JP | 2009-205978 A | 9/2009 |
| KR | 10-1335879 B1 | 12/2013 |
| KR | 2014-0077332 A | 6/2014 |

\* cited by examiner

FUEL CELL SYSTEM, VEHICLE HAVING THE SAME, AND CONTROL METHOD OF THE FUEL CELL SYSTEM

CROSS-REFERENCE TO RELATED APPLICATION

This application claims the benefit of Korean Patent Application No. 10-2016-0046248, filed on Apr. 15, 2016 in the Korean Intellectual Property Office, the disclosure of which is incorporated herein by reference.

BACKGROUND

1. Field of the Disclosure

The present disclosure relates to a fuel cell system of generating electric energy and supplying the electric energy to a vehicle, a vehicle having the fuel cell system, and a method of controlling the fuel cell system.

2. Description of the Related Art

In general, a fuel cell is a power generating device of electrochemically reacting fuel with an oxidizer to generate electric energy. Typically, the fuel cell uses hydrogen as fuel and oxygen as an oxidizer to generate electric energy. When oxygen and hydrogen are supplied to the unit cells of the fuel cell, a reverse reaction of water electrolysis is performed to generate electric energy. The unit cells are arranged in series to form a fuel cell stack, and a valve assembly is adopted to adjust a flow rate of fuel supplied to the fuel cell stack.

SUMMARY

Therefore, the present disclosure provides a fuel cell system of controlling a valve assembly to maintain a feed flow rate while avoiding a vibration generation range to reduce noise due to vibrations generated in the valve assembly, a vehicle including the fuel cell system, and a method of controlling the fuel cell system. Additional aspects of the disclosure will be set forth in part in the description which follows and, in part, will be obvious from the description, or may be learned by practice of the disclosure.

In accordance with one aspect of the present disclosure, a fuel cell system may include a fuel cell stack configured to receive fuel, and to generate electric energy; a valve assembly configured to adjust a flow rate of fuel supplied to the fuel cell stack; and a controller configured to oscillate the flow rate of the fuel to alternately have a first value that is equal to or greater than a upper limit value of a first vibration generation range and a second value that is equal to or less than a lower limit value of the first vibration generation range, when determining that the flow rate of the fuel supplied through the valve assembly is included in the first vibration generation range.

The controller may be configured to determine at least one of the first value, the second value, a maintenance time period of the first value, and a maintenance time period of the second value, to maintain the flow rate of the fuel at the same level as before oscillating the flow rate of the fuel. The controller may further be configured to generate a control signal based on one of proportional (P) control, proportional integral (PI) control, and proportional integral differential (PID) control, and transfer the control signal to the valve assembly, and wherein the controller may be configured to calculate a flow rate of fuel supplied through the valve assembly, based on the control signal.

When the controller determines that flow rates of fuel successively calculated a predetermined number of times are all included in the first vibration generation range, the controller may be configured to operate the valve assembly to oscillate the flow rate of the fuel between the first value and the second value. The controller may then be configured to determine the first value, the second value, the maintenance time period of the first value, and the maintenance time period of the second value, to adjust a value obtained by multiplying the maintenance time period of the first value by a difference between the calculated flow rate of fuel and the first value to be equal to a value obtained by multiplying the maintenance time period of the second value by a difference between the calculated flow rate of fuel and the second value.

When the controller determines that pulse width modulation (PWM) duty applied to the valve assembly is included in a second vibration generation range, the controller may be configured to determine that the flow rate of the fuel supplied through the valve assembly is included in the first vibration generation range. The controller may be configured to oscillate the PWM duty to alternately have a third value that is equal to or greater than an upper limit value of the second vibration generation range and a fourth value that is equal to or less than a lower limit value of the second vibration generation range.

The controller may be configured to determine at least one of the third value, the fourth value, a maintenance time period of the third value, and a maintenance time period of the fourth value, to maintain the flow rate of the fuel at the same level as before oscillating the flow rate of the fuel. When the controller determines that the PWM duty is included in the second vibration generation range for a predetermined time period or more, the controller may be configured to operate the valve assembly to oscillate the PWM duty between the third value and the fourth value.

In accordance with another aspect of the present disclosure, a vehicle may include a fuel cell system configured to generate electric energy; and a driving unit configured to drive the vehicle using the electric energy, wherein the fuel cell system may include: a fuel cell stack configured to receive fuel, and to generate the electric energy; a valve assembly configured to adjust a flow rate of fuel supplied to the fuel cell stack; and a controller configured to oscillate the flow rate of the fuel to alternately have a first value that is equal to or greater than a upper limit value of a first vibration generation range and a second value that is equal to or less than a lower limit value of the first vibration generation range, in response to determining that the flow rate of the fuel supplied through the valve assembly is included in the first vibration generation range. The controller may be configured to determine at least one of the first value, the second value, a maintenance time period of the first value, and a maintenance time period of the second value, to maintain the flow rate of the fuel at the same level as before oscillating the flow rate of the fuel.

In accordance with another aspect of the present disclosure, a method of controlling a fuel cell system including a valve assembly for adjusting a flow rate of fuel, may include calculating a flow rate of fuel supplied through the valve assembly; determining whether the calculated flow rate of fuel is included in a first vibration generation range; and in response to determining that the calculated flow rate of fuel is included in the first vibration generation range, oscillating the flow rate of the fuel to alternately have a first value that is equal to or greater than a upper limit value of the first vibration generation range and a second value that is equal to or less than a lower limit value of the first vibration generation range.

The oscillating may include determining at least one of the first value, the second value, a maintenance time period of the first value, and a maintenance time period of the second value, to maintain the flow rate of the fuel at the same level as before oscillating the flow rate of the fuel. Additionally, the oscillating may include operating the valve assembly to oscillate the flow rate of the fuel between the first value and the second value, when flow rates of fuel successively calculated a predetermined number of times are all included in the first vibration generation range. The oscillating may further include determining the first value, the second value, the maintenance time period of the first value, and the maintenance time period of the second value, to adjust a value obtained by multiplying the maintenance time period of the first value by a difference between the calculated flow rate of fuel and the first value to be equal to a value obtained by multiplying the maintenance time period of the second value by a difference between the calculated flow rate of fuel and the second value.

The determination of whether the calculated flow rate of fuel is included in the first vibration generation range may include determining whether pulse width modulation (PWM) duty applied to the valve assembly is included in a second vibration generation range, and determining, in response to determining that the PWM duty is included in the second vibration generation range, that the calculated flow rate of fuel is included in the first vibration generation range. The oscillating may include oscillating the PWM duty to alternately have a third value that is equal to or greater than a upper limit value of the second vibration generation range and a fourth value that is equal to or less than a lower limit value of the second vibration generation range.

Further, the oscillating may include determining at least one of the third value, the fourth value, a maintenance time period of the third value, and a maintenance time period of the fourth value, to maintain the flow rate of the fuel at the same level as before oscillating the flow rate of the fuel. The oscillating may also include oscillating the PWM duty to alternately have the third value and the fourth value, in response to determining that the PWM duty is included in the second vibration generation range for a predetermined time period or more.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Hereinafter, a vehicle and a control method thereof will be described in detail with reference to the accompanying drawings.

Figure 1:
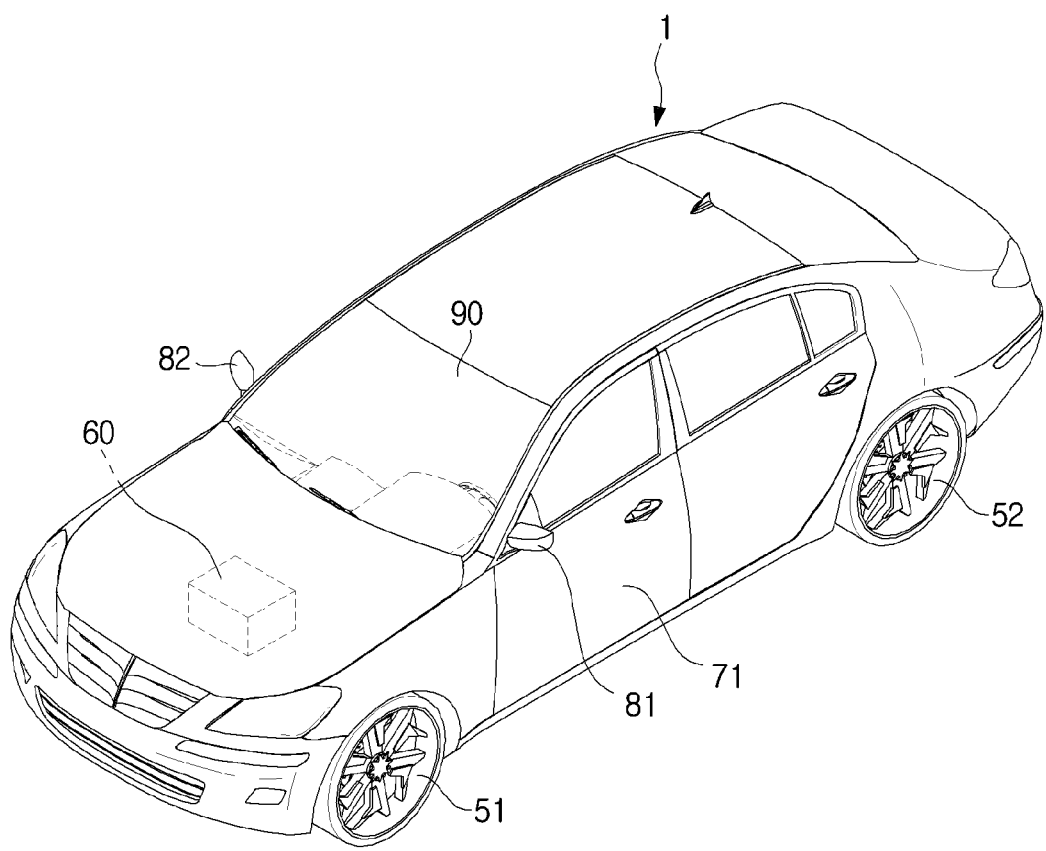
FIG. 1 shows an outer appearance of a vehicle including a fuel cell system according to an exemplary embodiment of the present disclosure.
Figure 2:
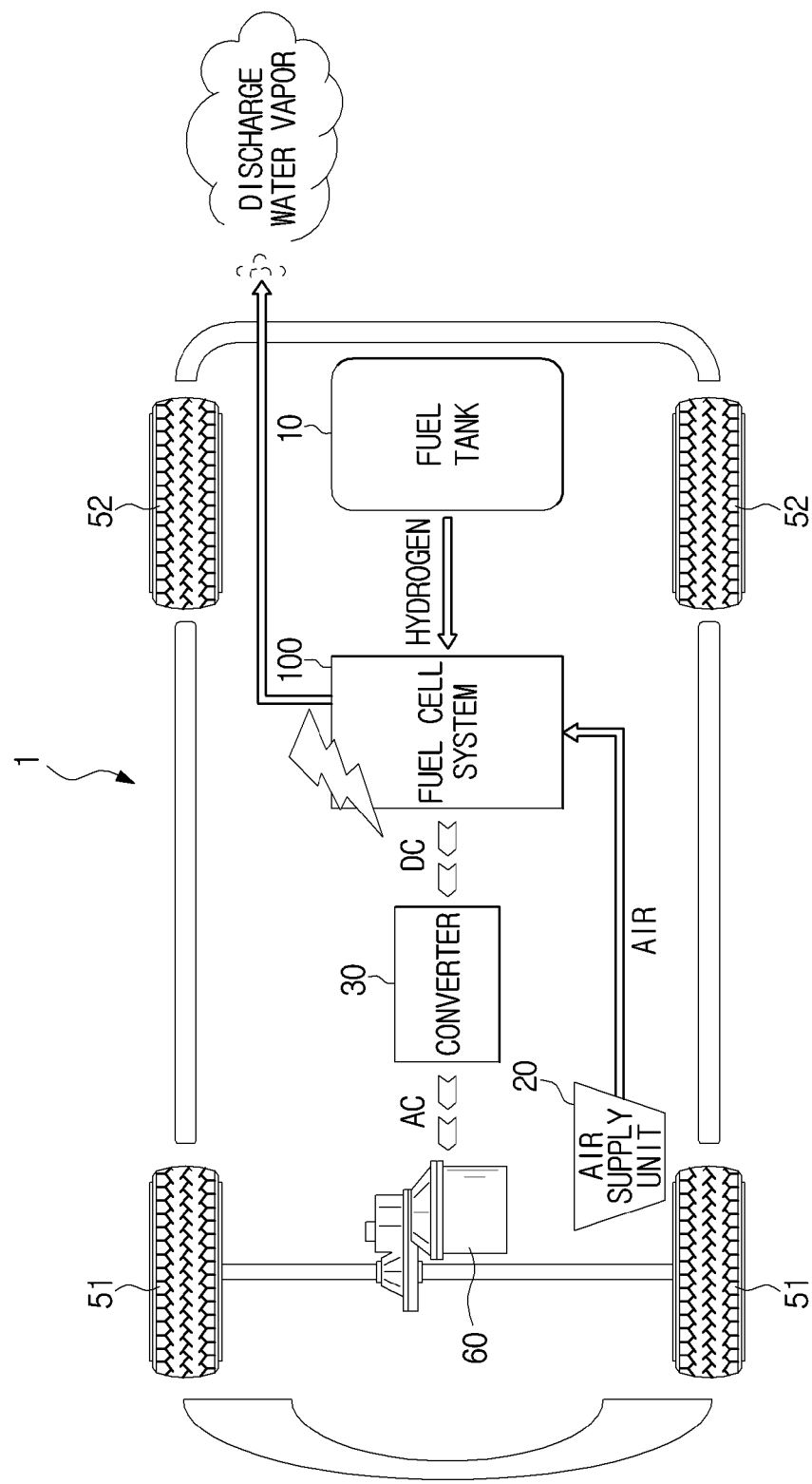
FIG. 2 is a configuration diagram of a vehicle including a fuel cell system according to an exemplary embodiment of the present disclosure.

FIG. 1 shows an outer appearance of a vehicle including a fuel cell system according to an exemplary embodiment of the present disclosure, and FIG. 2 is a configuration diagram of a vehicle including a fuel cell system according to an exemplary embodiment of the present disclosure. Referring to FIGS. 1 and 2, a vehicle 1 according to an exemplary embodiment of the present disclosure may include: a plurality of wheels 51 and 52 configured to move the vehicle 1; a driving apparatus 60 configured to rotate the wheels 51 and 52; a plurality of doors 71 configured to shield the inside of the vehicle 1 from the outside; a front glass 90 configured to provide a driver within the vehicle 1 with a front view of the vehicle 1; and side-view mirrors 81 and 82 configured to provide the driver with a rear view of the vehicle 1.

The front glass 90 may be disposed in the upper, front part of the vehicle 1 to provide the driver with a front or forward view of the vehicle 1. The front glass 30 may also be referred to as a windshield glass. The side-view mirrors 81 and 82 may include a left side-view mirror 81 disposed to the left of the vehicle 1 and a right side-view mirror 82 disposed to the right of the vehicle 1 to provide the driver inside the vehicle 1 with visual information of side and rear views of the vehicle 1. The wheels 51 and 52 may include a plurality of front wheels 51 disposed in the front part of the vehicle 1, and a plurality of rear wheels 51 disposed in the rear part of the vehicle 1. The driving apparatus 60 may provide rotatory power to the front wheels 51 or the rear wheels 52 to move the vehicle 1 forward or backward. FIGS. 1 and 2 relate to a front wheel driving method of applying rotatory power to the front wheels 51. Many vehicles adopt, as the driving apparatus 60, an internal combustion engine of burning fossil fuel such as oil to generate rotatory power. However, the driving apparatus 60 of the vehicle 1 according to an exemplary embodiment of the present disclosure may adopt a motor configured to receive power from a fuel cell system 100 to generate rotatory power.

The fuel cell system 100 may be configured to receive fuel from a fuel tank 10 in which fuel is stored, and receive air from an air supply unit 20 to generate electric energy. The electric energy may be transferred to the driving apparatus 60. For example, electric energy generated by the fuel cell system 100 may be converted to alternating-current (AC) power from direct-current (DC) power using a converter 30, and then transferred to the driving apparatus 60. The converter 30 may include a booster configured to boost a voltage, and an inverter configured to convert DC power to AC power. When the fuel cell system 100 uses hydrogen as fuel, water vapor ($H_2O$) generated by a reaction of hydrogen and oxygen will be discharged, instead of exhaust gas, such as carbon monoxide, nitrogen oxides, etc., generated when fossil fuel is used.

Figure 3:
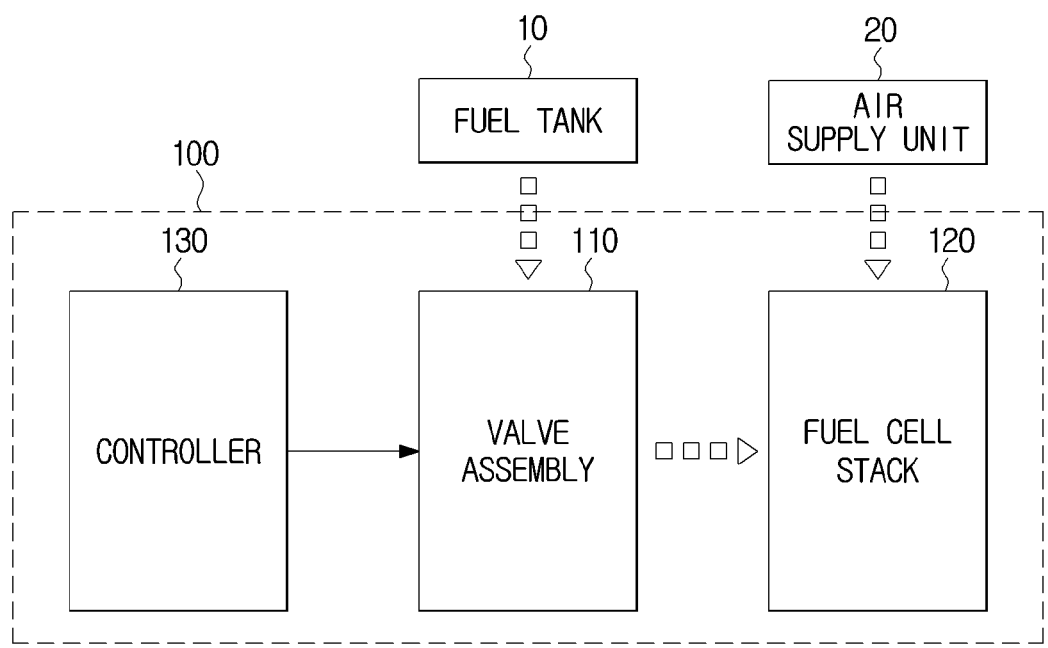
FIG. 3 is a control block diagram of the fuel cell system 100 according to an exemplary embodiment of the present disclosure.
Figure 4:
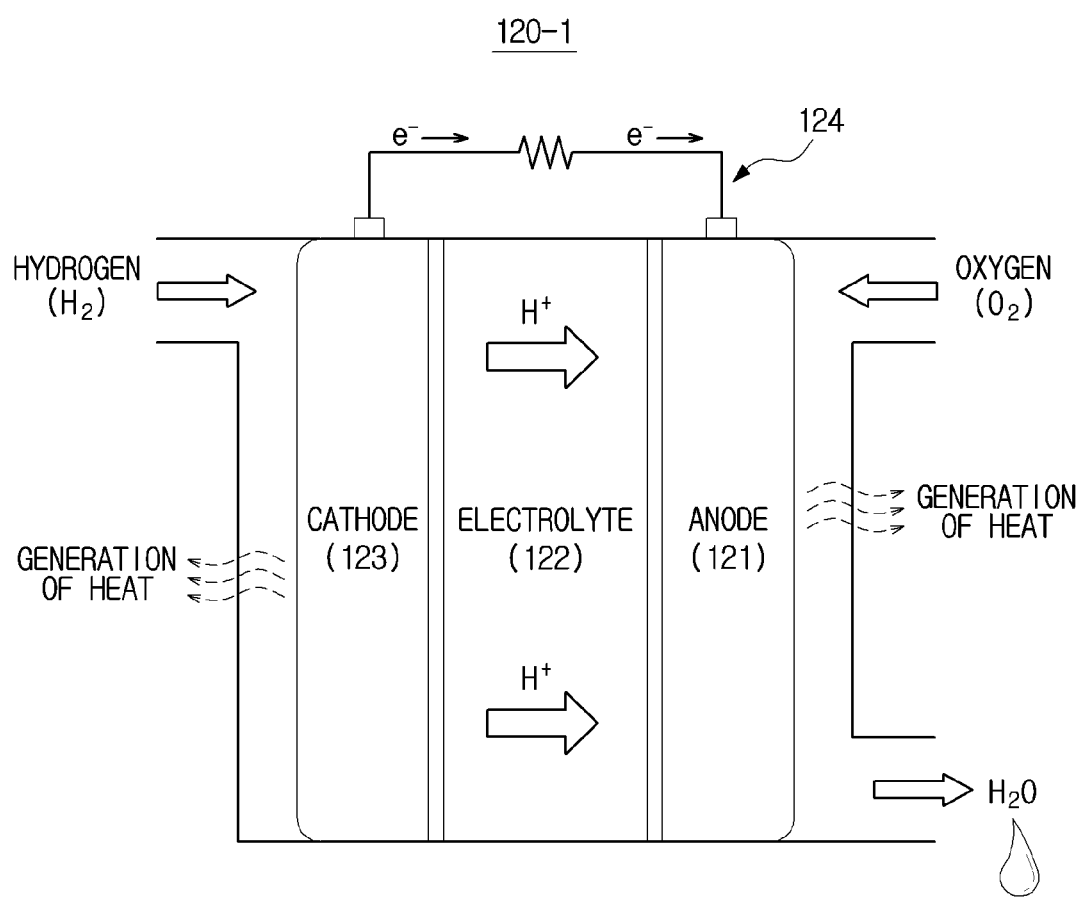
FIG. 4 shows a configuration of a unit cell included in the fuel cell system 100 according to an exemplary embodiment of the present disclosure.

FIG. 3 is a control block diagram of the fuel cell system 100 according to an exemplary embodiment of the present disclosure, and FIG. 4 shows a configuration of a unit cell included in the fuel cell system 100 according to an exemplary embodiment of the present disclosure. Referring to FIG. 3, the fuel cell system 100 according to an exemplary embodiment of the present disclosure may include: a valve assembly 110 configured to adjust a flow rate of fuel stored in the fuel tank 10 and to supply the fuel to a fuel cell stack 120; the fuel cell stack 120 configured to generate electric energy by a reaction of hydrogen and oxygen when fuel is received through the valve assembly 110 and oxygen is received through the air supply unit 20; and a controller 130 configured to operate the valve assembly 110.

In the current example, the fuel tank 10 and the air supply unit 20 are shown to be excluded from the configuration of the fuel cell system 100, however, the fuel tank 10 or the air supply unit 20 may be included in the configuration of the fuel cell system 100, according to changes in the design. Meanwhile, in the current exemplary embodiment, hydrogen may be adopted as fuel supplied to the fuel cell stack 120. Accordingly, hydrogen may be stored in the fuel tank 10. However, in some cases, fuel of hydrocarbon series, such as methanol, gasoline, LPG, etc., may be stored in the fuel tank 10, and a reformer for decomposing such fuel of hydrocarbon series to generate hydrogen may be disposed between the fuel tank 10 and the valve assembly 110. In other words, the type of fuel or a source of hydrogen supply stored in the fuel tank 10 is not limited, as long as it is capable of supplying hydrogen to the fuel cell stack 120 through the valve assembly 110. The fuel cell stack 120 may be formed by stacking a plurality of unit cells 120-1, for example, several to hundreds of unit cells 120-1, as shown in FIG. 4. Hereinafter, a process in which the unit cells 120-1 generate electric energy will be described with reference to FIG. 4.

Referring to FIG. 4, when oxygen is supplied to an anode 121 to each unit cell 120-1 and hydrogen is supplied to a cathode 123 of the unit cell 120-1, a reverse reaction of water electrolysis may be performed to generate electric energy. More specifically, when hydrogen molecules $H_2$ are supplied to the cathode 123, the hydrogen molecules $H_2$ may be split into hydrogen protons $H^+$ and electrons $e^-$ by a catalyst. The hydrogen protons $H^+$ may pass through electrolyte 122, whereas the electrons $e^-$ may not pass through the electrolyte 122. Instead, the electrons $e^-$ may flow to an external circuit 124 to generate DC electricity.

When oxygen molecules $O_2$ are supplied to the anode 121, the oxygen molecules $O_2$ may be combined with hydrogen protons $H^+$ and electrons $e^-$ passed through the electrolyte 122 to generate water $H_2O$ and heat. The unit cells 120-1 may be included in a single Membrane Electrode Assembly (MEA), and a plurality of MEAs may be connected in series to each other to constitute the fuel cell stack 120. Accordingly, the fuel cell stack 120 may generate a high voltage compared to a single unit cell 120-1.

Figure 5:
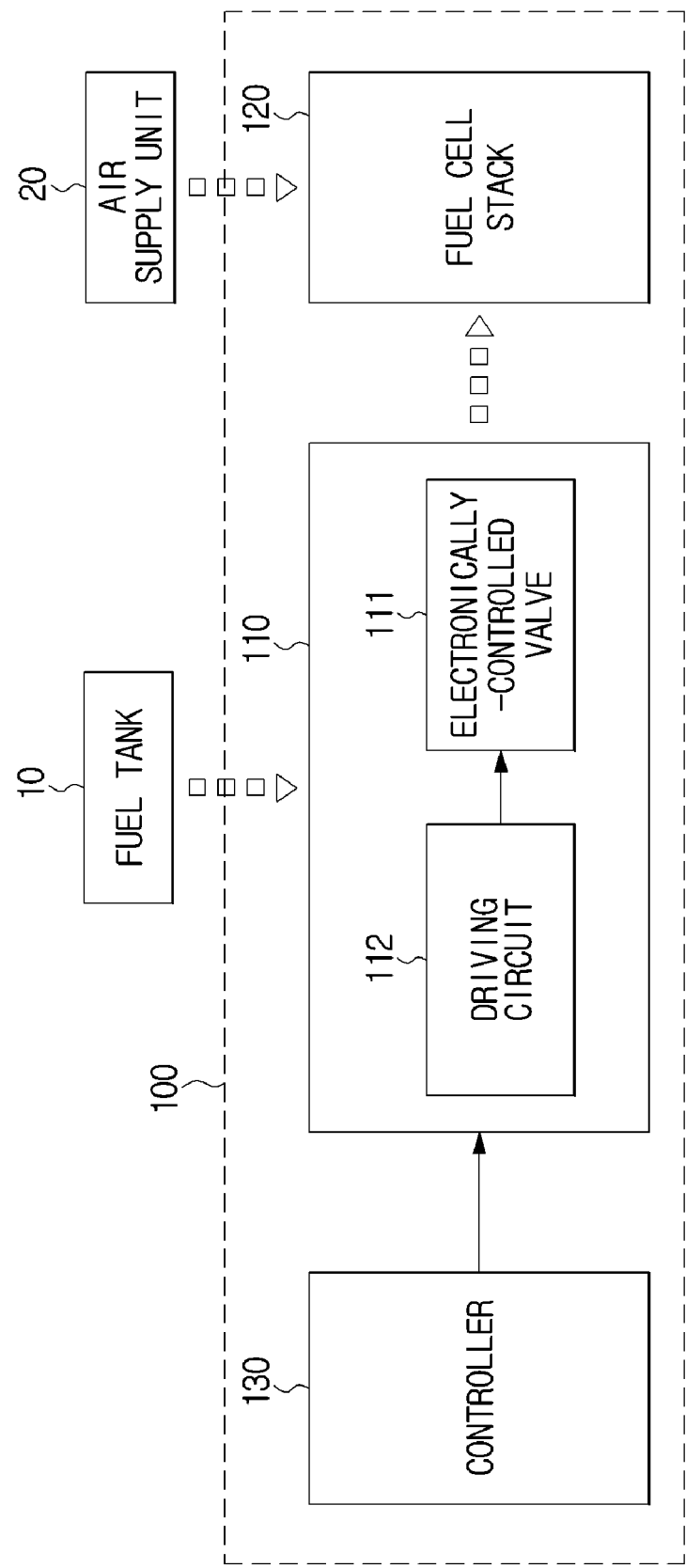
FIG. 5 is a control block diagram of the valve assembly 110 in the fuel cell system 100 according to an exemplary embodiment of the present disclosure.

FIG. 5 is a control block diagram of the valve assembly 110 in the fuel cell system 100 according to an exemplary embodiment of the present disclosure. The controller 130 may be configured to operate the valve assembly 110 based on power required for driving of the vehicle 100 to adjust a flow rate of hydrogen supplied to the fuel cell stack 120. In the current example, a case in which the valve assembly 110 starts or stops the supply of fuel while adjusting a flow rate of fuel is shown. However, the exemplary embodiments of the present disclosure are not limited thereto, and the fuel supply valve 110 for adjusting a flow rate of fuel and separate device for starting or stopping the supply of fuel may be provided.

Referring to FIG. 5, the valve assembly 110 may include an electronically-controlled valve 111 configured to automatically adjust an opening degree of the valve, and a driving circuit 112 configured to apply an electrical signal to the electronically-controlled valve 111. The valve assembly 110 may adopt, as the electronically-controlled valve 111, one of various types of valves that are automatically operated. For example, the electronically-controlled valve 111 may be implemented as a solenoid valve using an electromagnet. The solenoid valve may be configured to start or stop the supply of fluids or adjust the pressure (that is, a flow rate) of supplied fluids by supplying electricity through a solenoid coil configured with a core. In the current exemplary embodiment, a case in which the fuel supply valve 110 adopts, as the electronically-controlled valve 111, a solenoid valve configured to adjust a flow rate of supplied fluids while starting and stopping the supply of fluids will be described as an example.

The electronically-controlled valve 111 adopting a solenoid valve may be, according to its control method, implemented as a pulse width modulation (PWM) controlled solenoid valve capable of applying a PWM carrier frequency to the valve to change the pressure of fluid, or a proportional (P) controlled solenoid valve in which control pressure is generated in proportion to current flowing through a solenoid coil and valve displacement is determined based on a spring force applied to the valve, hydraulic pressure generated by exit control pressure fed back to the valve, etc. Additionally, the electronically-controlled valve 111 may be implemented as a proportional integral (PI) controlled solenoid valve to accumulate errors and add the result of the accumulation to a controlled variable, to reduce residual errors in the P control, or a proportional integral differential (PID) solenoid valve to compensate response speed.

Figure 6:
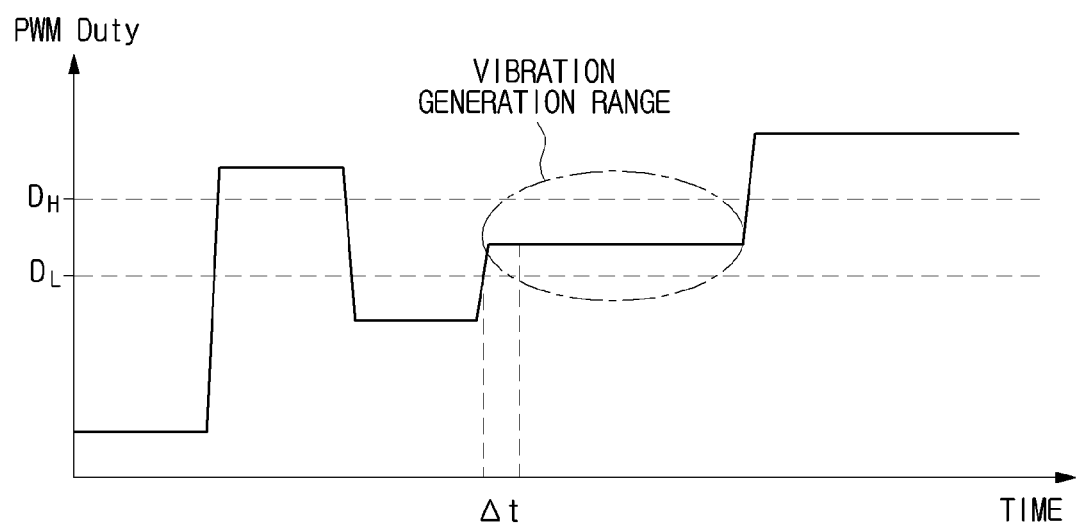
FIG. 6 is a view for describing a conventional method of applying PWM control to control the electronically-controlled valve 111 according to an exemplary embodiment of the present disclosure.
Figure 7:
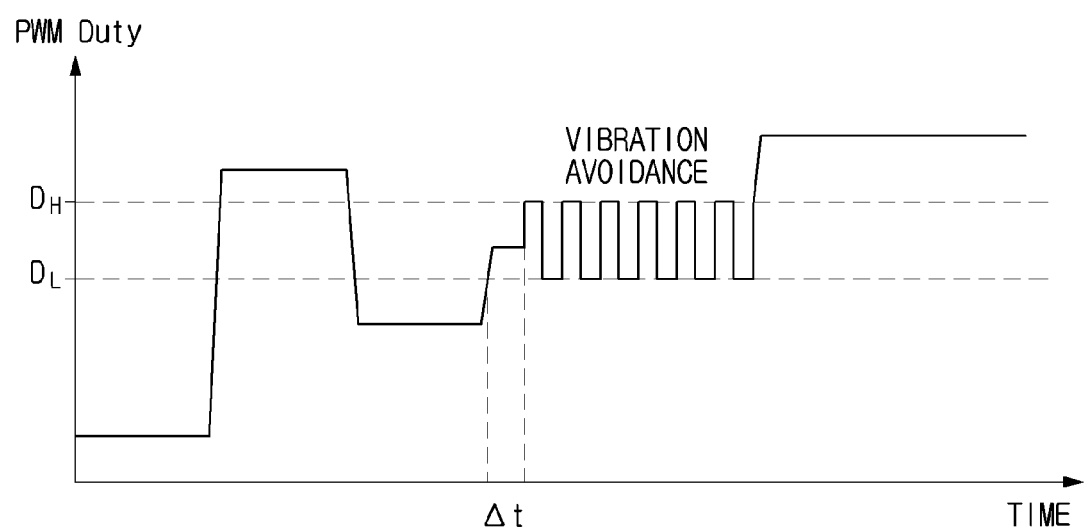
FIG. 7 is a view for describing a control method which the fuel cell system 100 according to an exemplary embodiment of the present disclosure applies to reduce vibrations generated in the electronically-controlled valve 111.

FIG. 6 is a view for describing a conventional method of applying PWM control to operate the electronically-controlled valve 111, and FIG. 7 is a view for describing a control method which the fuel cell system 100 according to an exemplary embodiment of the present disclosure applies to reduce vibrations generated in the electronically-controlled valve 111. The various methods described herein below may be executed by a controller having a memory and a processor. When applying a PWM carrier frequency to the electronically-controlled valve 111 implemented as a solenoid valve to adjust a flow rate of hydrogen, vibrations may be generated in a specific duty range $D_H$-$D_L$, as shown in FIG. 6. More specifically, when the duty of a PWN signal (ok) supplied to the electronically-controlled valve 111 is included in the specific range of $D_H$-$D_L$, vibrations may be generated. In the following description, the specific range $D_H$-$D_L$ in which vibrations may be generated in the electronically-controlled valve 111 will be referred to as a vibration generation range. The vibration generation range may vary based on the design details of the fuel cell stack 120.

Further, increasing the spring force of the electronically-controlled valve 111 to seal hydrogen may cause more vibrations of the electronically-controlled valve 111 in a specific range of flow. Such vibrations of the electronically-controlled valve 111 may generate noise and cause failure or abrasion of components due to collision between the components. Accordingly, the fuel cell system 100 according to an exemplary embodiment of the present disclosure may perform control for reducing vibrations of the electronically-controlled valve 111, which are generated in a specific range of flow. Hereinafter, a detailed exemplary embodiment therefor will be described.

Meanwhile, the vibration generation range may be defined by a flow rate of hydrogen, and operating the valve assembly 110 to avoid or reduce vibrations may indicate adjusting the flow rate of hydrogen. Since the flow rate of hydrogen may be adjusted based on a control signal applied to the valve assembly 110, the vibration generation range may be defined by a control signal such as a PWM signal applied to the valve assembly 110, and operating the valve assembly 110 may indicate outputting a control signal such as a PWM signal. Hereinafter, a PWM signal applied to the valve assembly 110 will be described with reference to FIGS. 7, 8A, 8B, and 8C.

Referring to FIG. 7, the controller 130 may be configured to prevent the duty of a PWM signal applied to the electronically-controlled valve 111 from being included in a vibration generation range, thereby avoiding or reducing vibrations. The vibration generation range may be determined in advance through an experiment, a simulation, etc. More specifically, the controller 130 may be configured to calculate PWM duty to be applied to the valve assembly 110, based on target pressure of hydrogen required for driving of the vehicle 1 and current pressure measured by a sensing device such as a pressure sensor or the like, generate a PWM control signal for applying the PWM duty, and transfer the PWM control signal to the valve assembly 110.

When the vibration generation range is determined as a range of $D_H$-$D_L$, and PWM duty calculated for supplying a target flow rate of hydrogen to the fuel cell stack 120 is included in the vibration generation range of $D_H$-$D_L$, the controller 130 may be configured to oscillate the PWM duty in the vibration generation range of $D_H$-$D_L$ to alternately have a first value and a second value that are not included in the vibration generation range of $D_H$-$D_L$, thereby avoiding vibrations. In particular, the first value of the oscillating PWM duty may be determined to be equal to or greater than the upper limit value of the vibration generation range of $D_H$-$D_L$, and the second value may be determined to be equal to or less than the lower limit value of the vibration generation range of $D_H$-$D_L$. In the following exemplary embodiment, the first value will be referred to as a maximum value $DO_H$ and the second value will be referred to as a minimum value $DO_L$, to compare the magnitude of the first value to that of the second value.

Additionally, the controller 130 may be configured to oscillate PWM duty when the PWM duty is continuously included in the vibration generation range of $D_H$-$D_L$ for a reference time period $\Delta t$ or more, to improve the reliability of the oscillation control for vibration avoidance. Herein, the reference time period $\Delta t$ may be determined in advance by an experiment, a simulation, etc. In particular, as shown in FIG. 7, it may be possible to apply a PWM signal having previously calculated duty for the reference time period $\Delta t$, and to oscillate the PWM duty after the reference time period $\Delta t$ elapses.

Meanwhile, although the PWM duty oscillates in the vibration generation range, the flow rate of hydrogen supplied to the fuel cell stack 120 may be required to be about the same as the flow rate of hydrogen supplied when the PWM duty does not oscillate, that is, the flow rate of hydrogen supplied by the previously calculated PWM duty. Accordingly, a target flow rate of hydrogen required for driving of the vehicle 1 may be supplied to the fuel cell stack 120.

Furthermore, the controller 130 may be configured to adjust the maximum value $DO_H$ and the minimum value $DO_L$ of the oscillating PWM duty, a maintenance time period of the maximum value $DO_H$, and a maintenance time period of the minimum value $DO_L$, to maintain the flow rate of hydrogen supplied to the fuel cell stack 120 at the same level as before oscillating the PWM duty.

Figure 8A:
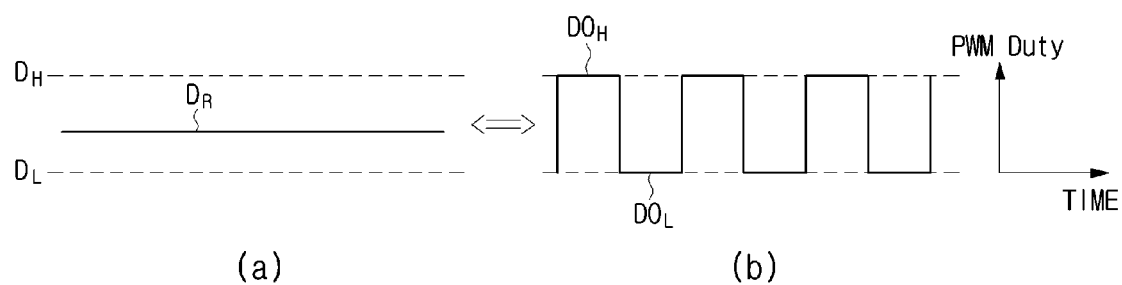
FIGS. 8A, 8B, and 8C show examples of a PWM control signal for supplying a target rate of hydrogen while oscillating PWM duty according to an exemplary embodiment of the present disclosure.
Figure 8B:
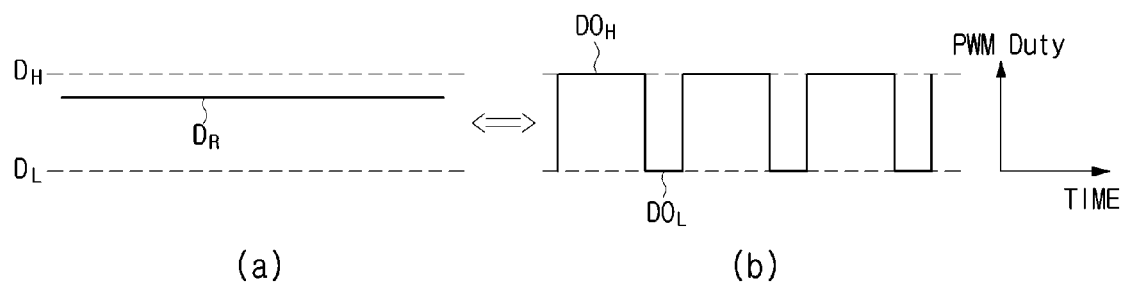
Figure 8C:
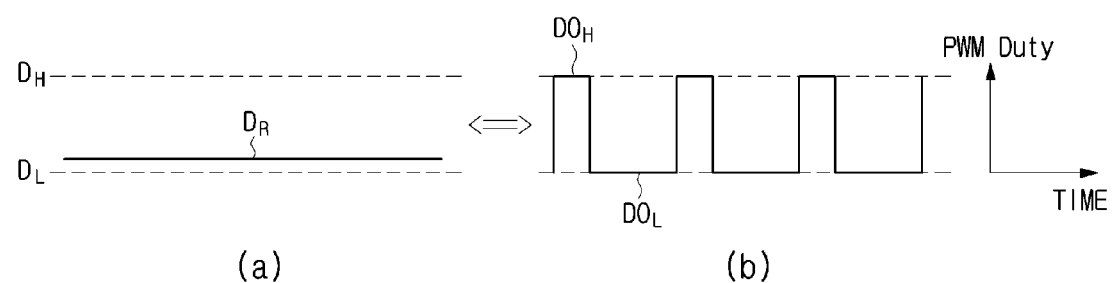

FIGS. 8A, 8B, and 8C show examples of a PWM control signal for supplying a target rate of hydrogen while oscillating PWM duty. As shown in the example of FIG. 8A, when PWM duty $D_R$ (hereinafter, referred to as target PWM duty) calculated for supplying a target flow rate of hydrogen is equal to or similar to an average value $(D_H+D_L)/2$ of the upper limit value $D_H$ and the lower limit value $D_L$ of a vibration generation range, a maintenance time period of the maximum value $DO_H$ and a maintenance time period of the minimum value $DO_L$ of oscillating PWM duty may be set to be equal to or similar to each other, thereby maintaining the feed flow rate of hydrogen at the same level as when the PWM duty does not oscillate.

Alternately, as shown in the example of FIG. 8B, when target PWM duty $D_R$ is close to (e.g., is about) the upper limit value $D_H$ of the vibration generation range, that is, when target PWM duty $D_R$ is greater than the average value $(D_H+D_L)/2$ of the upper limit value $D_H$ and the lower limit value $D_L$ of the vibration generation range, a maintenance time period of the maximum value $DO_H$ of oscillating PWM duty may be set to be greater than a maintenance time period of the minimum value $DO_L$ of the oscillating PWM duty, thereby maintaining the feed flow rate of hydrogen at the same level as when the PWM duty does not oscillate.

As shown in the example of FIG. 8C, when target PWM duty $D_R$ is close to the lower limit value $D_{HL}$ of the vibration generation range, that is, when target PWM duty $D_R$ is less than the average value $(D_H+D_L)/2$ of the upper limit value $D_H$ and the lower limit value $D_L$ of the vibration generation range, a maintenance time period of the minimum value $DO_L$ of oscillating PWM duty may be set to be greater than a maintenance time period of the maximum value $DO_H$ of the oscillating PWM duty, thereby maintaining the feed flow rate of hydrogen at the same level as when the PWM duty does not oscillate.

The examples of FIGS. 8A, 8B, and 8C relate to a case in which the maximum value $DO_H$ and the minimum value $DO_L$ of the oscillating PWM duty are set to the upper limit value $D_H$ and the lower limit value $D_L$ of the vibration generation range. In particular, crossover due to overflow of hydrogen can be prevented, and the output of the fuel cell system 100 may be maintained. However, the exemplary embodiments of the present disclosure are not limited to this, as long as the maximum value $DO_H$ of oscillating PWM duty is equal to or greater than the upper limit value $D_H$ of a vibration generation range, and the minimum value $DO_L$ of the oscillating PWM duty is equal to or less than the lower limit value $D_L$ of the vibration generation range, as described above.

In other words, the controller 130 may be configured to determine the maximum value $DO_H$ and the minimum value $DO_L$ of oscillating PWM duty, a maintenance time period of the maximum value $DO_H$, and a maintenance time period of the minimum value $DO_L$, based on a target flow rate of hydrogen to be supplied to the fuel cell stack 120, crossover due to overflow of hydrogen, the maintenance of the output of the fuel cell system 100, etc. As described above, the electronically-controlled valve 111 may be implemented as a P controlled solenoid valve. Hereinafter, an exemplary embodiment in which the electronically-controlled valve 111 is implemented as a P controlled solenoid valve will be described.

The controller 130 may be configured to perform P control on the valve assembly 110, based on target pressure of hydrogen required for driving of the vehicle 1 and current pressure of hydrogen measured by a sensing device such as a pressure sensor or the like. Alternatively, the controller 130 may be configured to perform PI control or PID control on the valve assembly 110. When the controller 130 performs P control on the valve assembly 110, the controller 130 may be configured to determine whether a feed flow rate of hydrogen is included in the vibration generation range.

The vibration generation range of the electronically-controlled valve 111 may be defined by a feed flow rate of hydrogen, and the upper limit value and the lower limit value of the flow rate of hydrogen defining the vibration generation range may be determined in advance through an experiment, a simulation, etc. Since a feed flow rate of hydrogen may be determined based on an opening degree of the electronically-controlled valve 111, the controller 130 may be configured to calculate a feed flow rate of hydrogen based on a P controlled signal applied to the driving circuit 112.

Accordingly, when the calculated flow rate of hydrogen is included in the vibration generation range, the controller 130 may be configured to determine that vibrations will be generated in the electronically-controlled valve 111, and perform oscillation control with respect to the flow rate of hydrogen. Further, to improve the reliability of the oscillation control, when flow rates of hydrogen successively calculated a predetermined number N of times are all included in the vibration generation range, the controller 130 may be configured to perform oscillation control. For example, the controller 130 may be configured to calculate a flow rate of hydrogen at regular time intervals.

Similar to the oscillation control with respect to PWM duty, the controller 130 may be configured to oscillate the flow rate of hydrogen to alternately have a first value and a second value that are not included in the vibration generation range, thereby avoiding vibrations. Additionally, in the following exemplary embodiment, to compare the magnitude of the first value to the magnitude of the second value, the first value will be referred to as a maximum value $FO_H$, and the second value will be referred to as a minimum value $FO_L$. The first value and the second value used in the current exemplary embodiment may be used to compare oscillating two values to each other, and accordingly, there is no limitation on which one of the two values is used as the first value and which one of the two values is used as the second value.

To distinguish the oscillation control with respect to the flow rate of hydrogen from the above-described oscillation control with respect to PWM duty, one of the vibration generation range for PWM duty and the vibration generation range for the flow rate of hydrogen will be referred to as a first vibration generation range, and the other one will be referred to as a second vibration generation range. The first value and the second value used in the oscillation control with respect to the flow rate of hydrogen will be referred to as a first value and a second value, respectively, and the first value and the second value used in the oscillation control with respect to PWM duty will be referred to as a third value, and a fourth value, respectively.

FIGS. 9A to 9C and FIGS. 10A and 10B show examples of control signals for controlling the electronically-controlled valve 111 implemented as a P controlled solenoid valve. When a vibration generation range is defined by a upper limit value H and a lower limit value L of a flow rate of hydrogen, and flow rates of hydrogen calculated N times during P control are all included in the vibration generation range, the controller 130 may be configured to oscillate a flow rate of hydrogen supplied to the fuel cell stack 120.

Figure 9A:
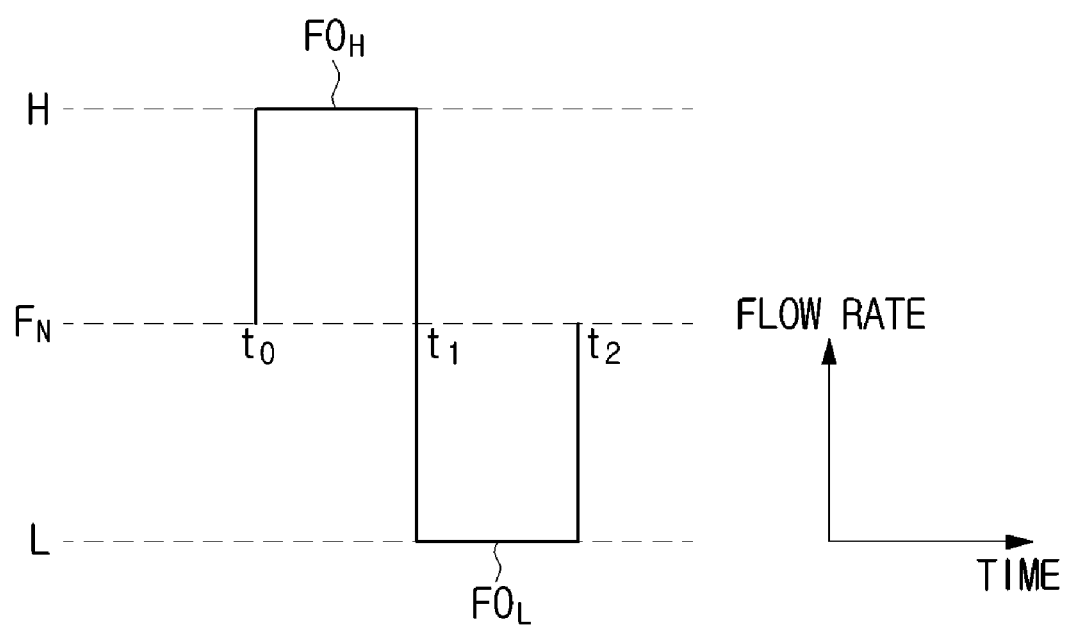
FIGS. 9A to 9C and FIGS. 10A and 10B show examples of control signals for controlling the electronically-controlled valve 111 implemented as a P controlled solenoid valve according to an exemplary embodiment of the present disclosure.
Figure 9B:
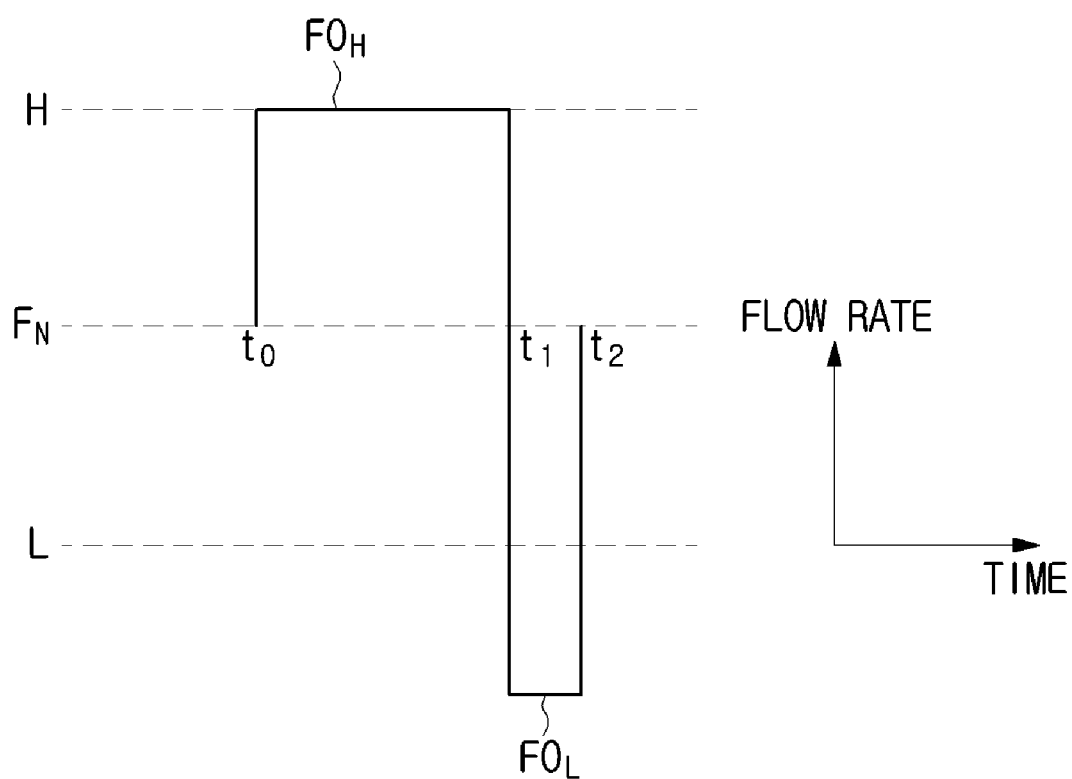
Figure 9C:
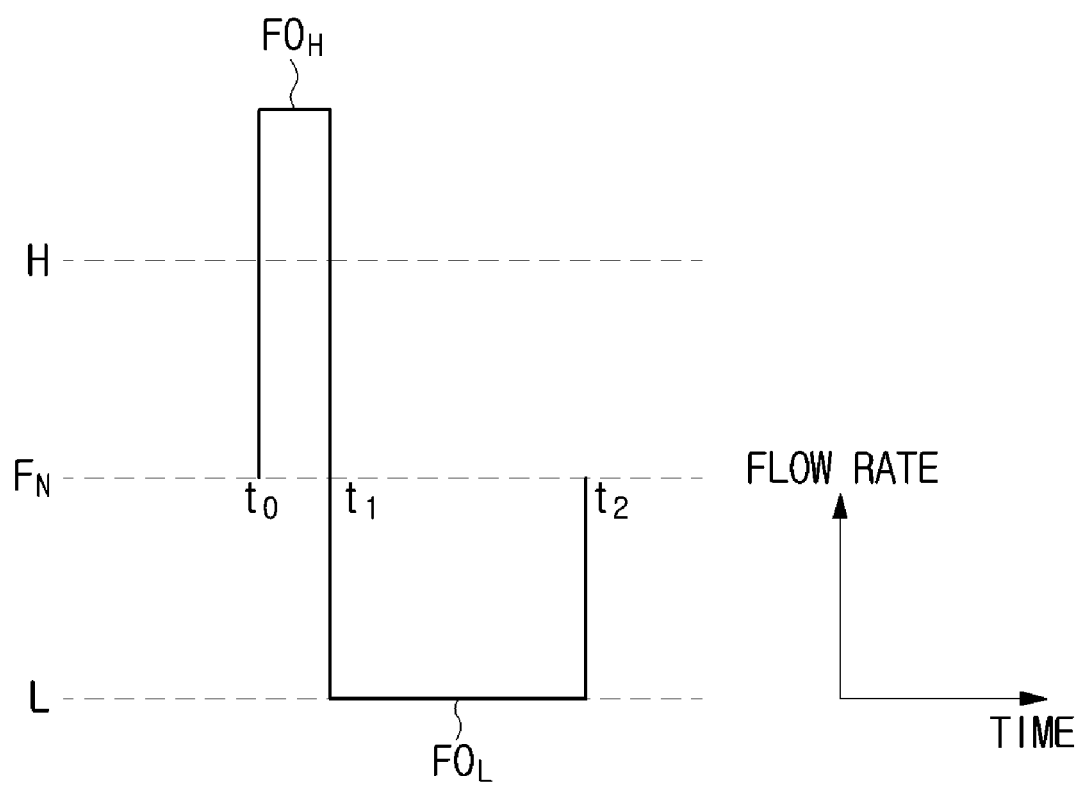

The controller 130 may be configured to set the maximum value $FO_H$ of an oscillating flow rate of hydrogen to the upper limit value H of the vibration generation range, and the minimum value $FO_L$ of the oscillating flow rate of hydrogen to the lower limit value L of the vibration generation range, to prevent overflow of hydrogen and maintain the output of the fuel cell system 100, as shown in the examples of FIGS. 9A, 9B, and 9C. Additionally, as shown in FIG. 9A, when a N-th calculated flow rate $F_N$ of hydrogen is close to an average value (H+L)/2 of the upper limit value H and the lower limit value L of the vibration generation range, the controller 130 may be configured to set a maintenance time period $t_1$-$t_0$ of the maximum value $FO_H$ of an oscillating flow rate of hydrogen and a maintenance time period $t_2$-$t_1$ of the minimum value $FO_L$ of the oscillating flow rate of hydrogen to the same value, thereby maintaining the flow rate of hydrogen at the same level as before oscillating the flow rate of hydrogen.

As shown in FIG. 9B, when the N-th calculated flow rate $F_N$ of hydrogen is greater than the average value (H+L)/2 of the upper limit value H and the lower limit value L of the vibration generation range, the controller 130 may be configured to set a maintenance time period $t_1$-$t_0$ of the maximum value $FO_H$ of an oscillating flow rate of hydrogen to be greater than a maintenance time period $t_2$-$t_1$ of the minimum value $FO_L$ of the oscillating flow rate of hydrogen, thereby maintaining the flow rate of hydrogen at the same level as before oscillating the flow rate of hydrogen.

As shown in FIG. 9C, when the N—the calculated flow rate $F_N$ of hydrogen is less than the average value (H+L)/2 of the upper limit value H and the lower limit value L of the vibration generation range, the controller 130 may be configured to set a maintenance time period $t_1$-$t_0$ of the maximum value $FO_H$ of an oscillating flow rate of hydrogen to be less than a maintenance time period $t_2$-$t_1$ of the minimum value $FO_L$ of the oscillating flow rate of hydrogen, thereby maintaining the flow rate of hydrogen at the same level as before oscillating the flow rate of hydrogen.

Meanwhile, the maximum value $FO_H$ or the minimum value $FO_L$ of the oscillating flow rate of hydrogen may be set to be different from the upper limit value H or the lower limit value L of the vibration generation range. In particular, by adjusting the maintenance time period of the maximum value $FO_H$ of the oscillating flow rate of hydrogen or the maintenance time period of the minimum value $FO_L$ of the oscillating flow rate of hydrogen, based on the magnitude of the N-th calculated flow rate $F_N$ of hydrogen and the magnitude of the maximum value $FO_H$ or the minimum value $FO_L$ of the oscillating flow rate of hydrogen, the controller 130 may be configured to maintain the flow rate of hydrogen at the same level as before oscillating the flow rate of hydrogen.

Figure 10A:
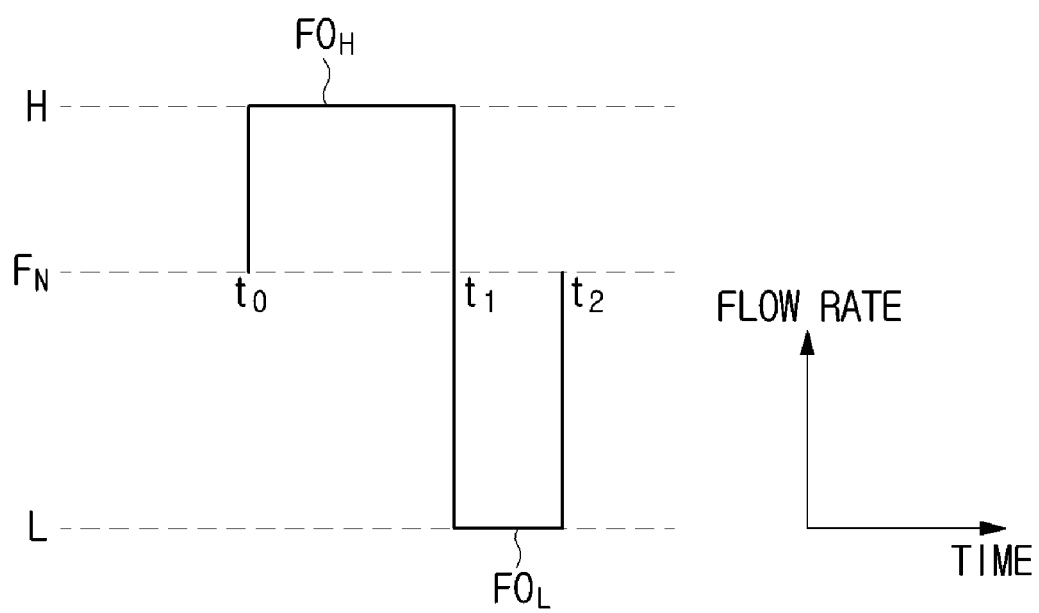
Figure 10B:
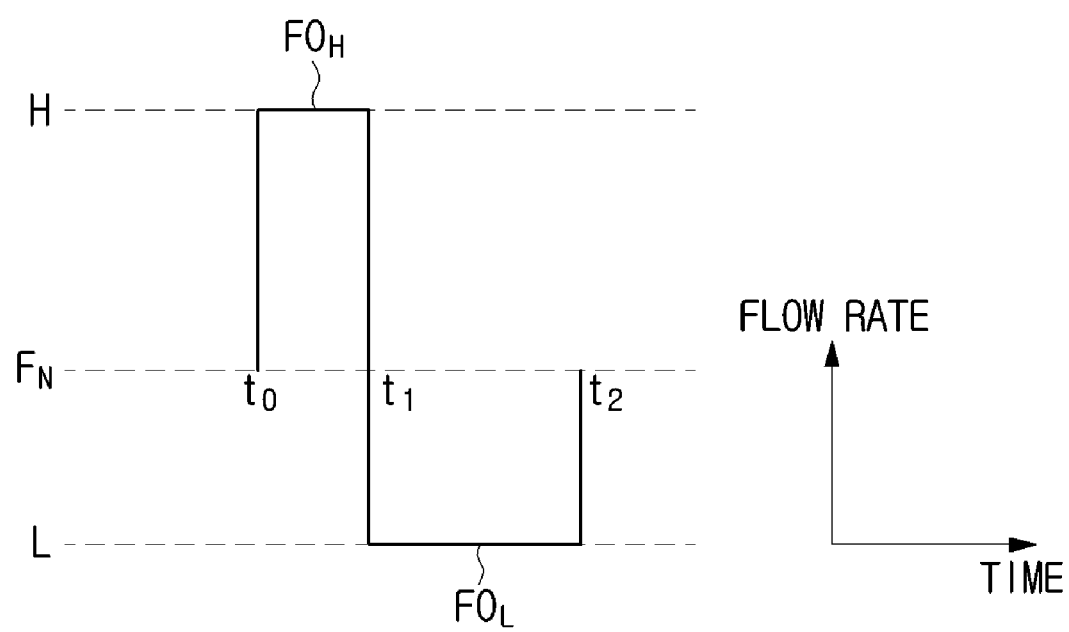

For example, as shown in FIG. 10A, the controller 130 may be configured to set the minimum value $FO_L$ of the oscillating flow rate of hydrogen to be less than the lower limit value L of the vibration generation range, and reduce the maintenance time $t_2$-$t_1$ to maintain the flow rate of hydrogen at the same level as before oscillating the flow rate of hydrogen. As shown in FIG. 10B, the controller 130 may be configured to set the maximum value $FO_H$ of the oscillating flow rate of hydrogen to be greater than the upper limit value H of the vibration generation range, and reduce the maintenance time $t_1$-$t_0$ to maintain the flow rate of hydrogen at the same level as before oscillating the flow rate of hydrogen.

Additionally, although not shown in the drawings, the controller 130 may be configured to set the maximum value $FO_H$ of the oscillating flow rate of hydrogen to be greater than the upper limit value H of the vibration generation range, while setting the minimum value $FO_L$ of the oscillating flow rate of hydrogen to be less than the lower limit value L of the vibration generation range. As described above, parameters, such as the maximum value $FO_H$, the minimum value $FO_L$, and the oscillation maintenance time periods $t_2$-$t_0$, $t_2$-$t_1$, and $t_1$-$t_0$, applied to oscillate the flow rate of hydrogen, may be set to satisfy the following Equation 1 below to maintain the flow rate of hydrogen at the same level as before oscillating the flow rate of hydrogen.

$$FO_H = \{F_N \times (t_2-t_0) - FO_L \times (t_2-t_1)\}/(t_1-t_0) \quad (1)$$

The controller 130 may be configured to calculate a (N+1)-th flow rate of hydrogen at the time of $t_2$, determine whether the calculated (N+1)-th flow rate of hydrogen is included in the vibration generation range, repeat the above-described process to perform oscillation control in response to determining that the calculated (N+1)-th flow rate of hydrogen is included in the vibration generation range, and perform P control in response to determining that the calculated (N+1)-th flow rate of hydrogen is not included in the vibration generation range.

Hereinafter, an exemplary embodiment of a method of controlling a fuel cell system will be described. The fuel cell system 100 according to the above-described exemplary embodiment may be applied to the exemplary embodiment of the method of controlling the fuel cell system. In some cases, a vehicle including the fuel cell system 100 may be applied to the exemplary embodiment of the method of controlling the fuel cell system. Accordingly, the above description about the fuel cell system 100 may be applied to the exemplary embodiment of the method of controlling the fuel cell system.

Figure 11:
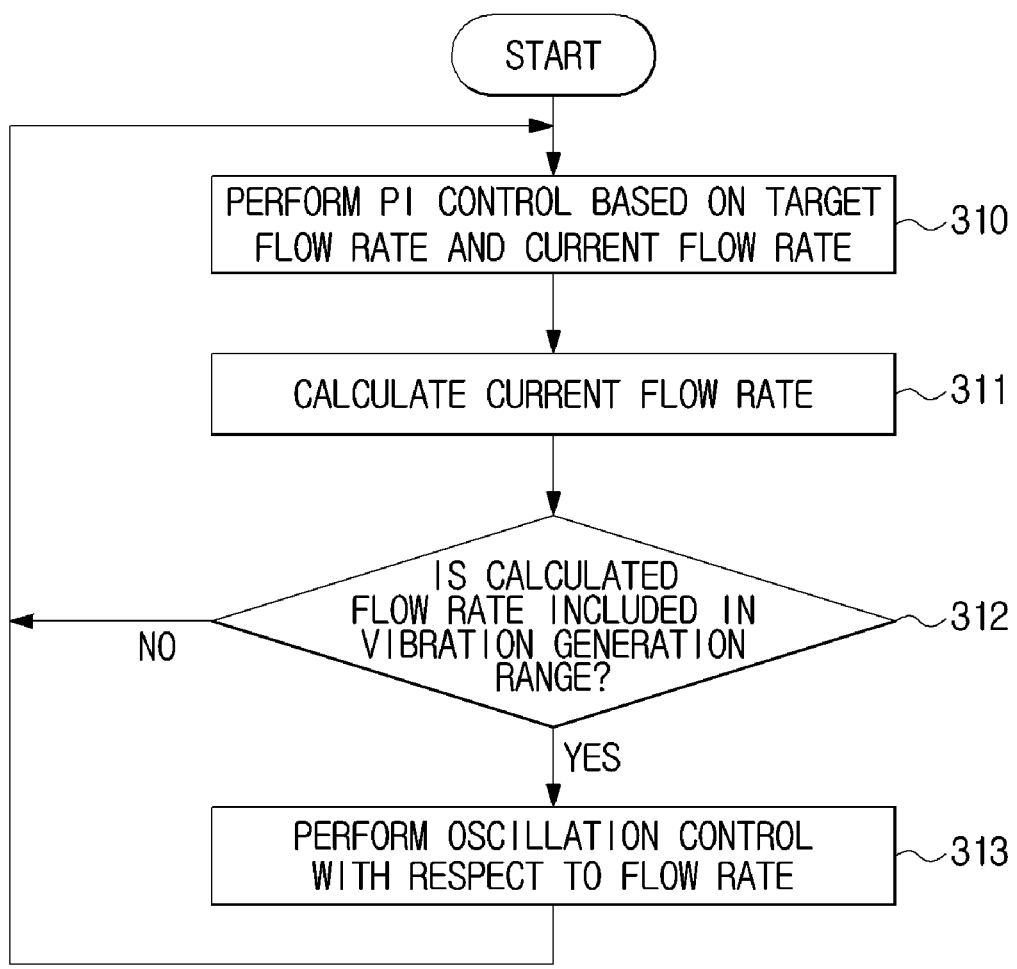
FIGS. 11 and 12 are flowcharts illustrating a method of controlling the fuel cell system 100, according to an exemplary embodiment of the present disclosure.
Figure 12:
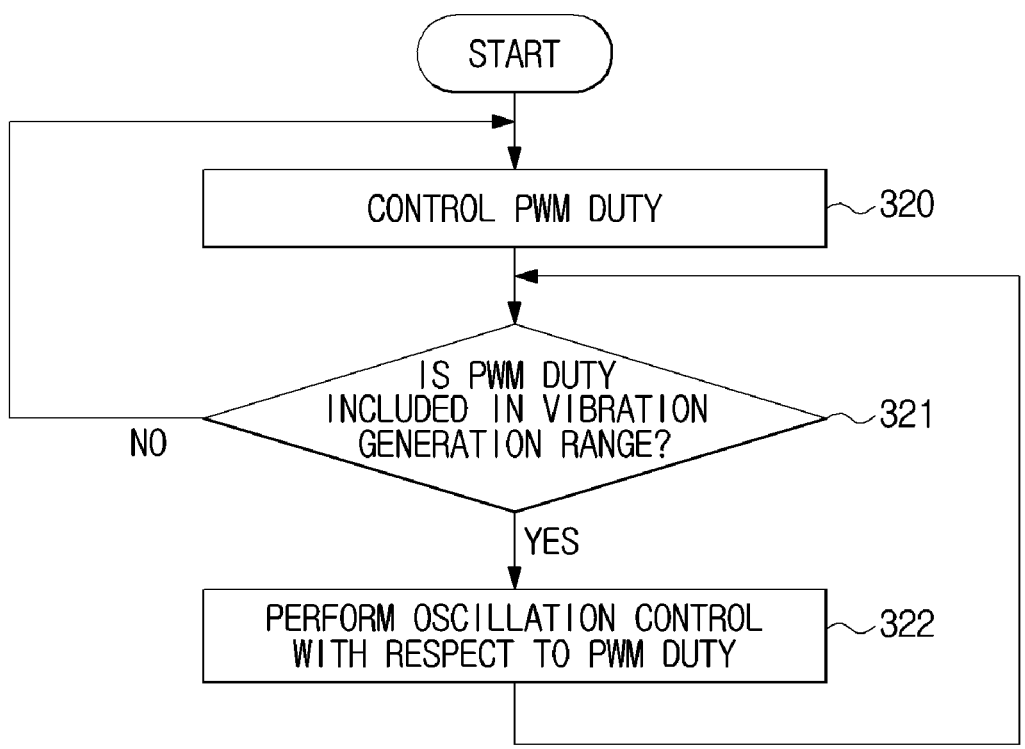

FIGS. 11 and 12 are flowcharts illustrating a method of controlling the fuel cell system 100, according to an exemplary embodiment of the present disclosure. In FIG. 11, a case in which the fuel cell system 100 adopts a PI controlled solenoid valve will be described as an example. Referring to FIG. 11, the controller 130 may be configured to perform PI control based on a target flow rate and a current flow rate, in operation 310. More specifically, the controller 130 may be configured to perform PI control on the valve assembly 110, based on target pressure of hydrogen required for driving of the vehicle 1 and current pressure of hydrogen measured by a sensing device such as a pressure sensor or the like. Alternately, the controller 130 may be configured to perform P control or PID control.

Since the PI control corresponds to feedback control, the controller 130 may be configured to again calculate a current flow rate while performing the PI control, in operation 311. Then, the controller 130 may be configured to determine whether the calculated flow rate is included in a vibration generation range, in operation 312. When the controller 130 determines that the calculated flow rate is included in the vibration generation range ("Yes" in operation 312), the controller 130 may be configured to determine that vibrations will be generated, and perform oscillation control with respect to the flow rate of hydrogen to avoid or reduce the vibrations, in operation 313. Further, the controller 130 may be configured to perform oscillation control when flow rates of hydrogen successively calculated a predetermined number N of times are all included in the vibration generation range, to improve the reliability of the oscillation control.

The oscillation control with respect to the flow rate of hydrogen may include periodically adjusting or changing a feed flow rate of hydrogen between a value that is equal to or greater than the upper limit value of the vibration generation range and a value that is equal to or less than the lower limit value of the vibration generation range to supply a target flow rate of hydrogen while preventing the flow rate of hydrogen from being included in the vibration generation range to avoid or reduce vibrations generated in the valve assembly 110. The vibration generation range may be determined in advance by an experiment, a simulation, etc., and may be defined by a flow rate of hydrogen. The oscillation control with respect to the flow rate of hydrogen has been described above in the exemplary embodiment of the fuel cell system 100, and accordingly, further detailed descriptions thereof will be omitted. When the controller 130 determines that the calculated flow rate is not included in the vibration generation range ("No" in operation 312), the controller 130 may be configured to perform the PI control.

In FIG. 12, a case in which the fuel cell system 100 adopts a PWM controlled solenoid valve will be described as an example. The controller 130 may be configured to adjust PWM duty applied to the electronically-controlled valve 111, in operation 320. More specifically, the controller 130 may be configured to calculate PWM duty applied to the electronically-controlled valve 111, based on target pressure of hydrogen required for driving of the vehicle 1 and current pressure of hydrogen measured by a sensing device such as a pressure sensor or the like, generate a PWM control signal for applying the calculated PWM duty, and transfer the PWM control signal to the driving circuit 112 of the valve assembly 110.

Then, the controller 130 may be configured to determine whether the PWM duty is included in a vibration generation range, in operation 321. When the controller 130 determines that the PWM duty is included in the vibration generation range ("Yes" in operation 321), the controller 130 may be configure to determine that vibrations will be generated in the valve assembly 110, and perform oscillation control with respect to PWM duty to avoid or reduce the vibrations, in operation 322. To improve the reliability of the oscillation control, the controller 130 may be configured to perform oscillation control when the PWM duty is included in the vibration generation range for a predetermined time period or more.

The oscillation control with respect to PWM duty may include to periodically changing or adjusting PWM duty between a value that is equal to or greater than the upper limit value of the vibration generation range and a value that is equal to or less than the lower limit value of the vibration generation range to supply a target flow rate of hydrogen while preventing the flow rate of hydrogen from being included in the vibration generation range to avoid or reduce vibrations that are generated in the valve assembly 110. The vibration generation range may be determined in advance by an experiment, a simulation, etc., and may be defined by a PWM duty value. The oscillation control with respect to PWM duty has been described above in the exemplary embodiment of the fuel cell system 100, and accordingly, further detailed descriptions thereof will be omitted. According to the fuel cell system 100, the vehicle 1 including the fuel cell system 100, and the method of controlling the fuel cell system 100, as described above, by controlling the valve assembly 110 to maintain a feed flow rate of hydrogen while avoiding a vibration generation range, it may be possible to maintain gas mileage while reducing vibrations at low cost.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

What is claimed is:

1. A fuel cell system, comprising:
a fuel cell stack configured to receive fuel and to generate electric energy;
a valve assembly configured to adjust a flow rate of fuel supplied to the fuel cell stack; and
a controller configured to oscillate the flow rate of the fuel to alternately have a first value that is equal to or greater than a upper limit value of a first vibration generation range and a second value that is equal to or less than a lower limit value of the first vibration generation range, in response to determining that the flow rate of the fuel supplied through the valve assembly is included in the first vibration generation range.

2. The fuel cell system according to claim 1, wherein the controller is configured to determine at least one from the group consisting of: the first value, the second value, a maintenance time period of the first value, and a maintenance time period of the second value, to maintain the flow rate of the fuel at the same level as before oscillating the flow rate of the fuel.

3. The fuel cell system according to claim 2, wherein the controller is configured to generate a control signal based on one of proportional (P) control, proportional integral (PI) control, and proportional integral differential (PID) control, and transfer the control signal to the valve assembly, and wherein the controller is configured to calculate a flow rate of fuel supplied through the valve assembly, based on the control signal.

4. The fuel cell system according to claim 3, wherein when the controller determines that flow rates of fuel successively calculated a predetermined number of times are all included in the first vibration generation range, the controller is configured to operate the valve assembly to oscillate the flow rate of the fuel between the first value and the second value.

5. The fuel cell system according to claim 3, wherein the controller is configured to determine the first value, the second value, the maintenance time period of the first value, and the maintenance time period of the second value, to adjust a value obtained by multiplying the maintenance time period of the first value by a difference between the calculated flow rate of fuel and the first value to be equal to a value obtained by multiplying the maintenance time period of the second value by a difference between the calculated flow rate of fuel and the second value.

6. The fuel cell system according to claim 1, wherein when the controller determines that pulse width modulation (PWM) duty applied to the valve assembly is included in a second vibration generation range, the controller is configured to determine that the flow rate of the fuel supplied through the valve assembly is included in the first vibration generation range.

7. The fuel cell system according to claim 6, wherein the controller is configured to oscillate the PWM duty to alternately have a third value that is equal to or greater than a upper limit value of the second vibration generation range and a fourth value that is equal to or less than a lower limit value of the second vibration generation range.

8. The fuel cell system according to claim 7, wherein the controller is configured to determine at least one selected from the group consisting of: the third value, the fourth value, a maintenance time period of the third value, and a maintenance time period of the fourth value, to maintain the flow rate of the fuel at the same level as before oscillating the flow rate of the fuel.

9. The fuel cell system according to claim 7, wherein when the controller determines that the PWM duty is included in the second vibration generation range for a predetermined time period or more, the controller is configured to operate the valve assembly to oscillate the PWM duty between the third value and the fourth value.

10. A vehicle, comprising:
a fuel cell system configured to generate electric energy; and
a driving unit configured to drive the vehicle using the electric energy,
wherein the fuel cell system comprises:
a fuel cell stack configured to receive fuel and to generate the electric energy;
a valve assembly configured to adjust a flow rate of fuel supplied to the fuel cell stack; and
a controller configured to oscillate the flow rate of the fuel to alternately have a first value that is equal to or greater than a upper limit value of a first vibration generation range and a second value that is equal to or less than a lower limit value of the first vibration generation range, in response to determining that the flow rate of the fuel supplied through the valve assembly is included in the first vibration generation range.

11. The vehicle according to claim 10, wherein the controller is configured to determine at least one selected from the group consisting of: the first value, the second value, a maintenance time period of the first value, and a maintenance time period of the second value, to maintain the flow rate of the fuel at the same level as before oscillating the flow rate of the fuel.

12. A method of controlling a fuel cell system including a valve assembly for adjusting a flow rate of fuel, comprising:
calculating, by a controller, a flow rate of fuel supplied through the valve assembly;
determining, by the controller, whether the calculated flow rate of fuel is included in a first vibration generation range; and
in response to determining that the calculated flow rate of fuel is included in the first vibration generation range, oscillating, by the controller, the flow rate of the fuel to alternately have a first value that is equal to or greater than a upper limit value of the first vibration generation range and a second value that is equal to or less than a lower limit value of the first vibration generation range.

13. The method according to claim 12, wherein the oscillating includes:
determining, by the controller, at least one selected from the group consisting of: the first value, the second value, a maintenance time period of the first value, and a maintenance time period of the second value, to maintain the flow rate of the fuel at the same level as before oscillating the flow rate of the fuel.

14. The method according to claim 13, wherein the oscillating includes:
operating, by the controller, the valve assembly to oscillate the flow rate of the fuel between the first value and the second value, if flow rates of fuel successively calculated a predetermined number of times are all included in the first vibration generation range.

15. The method according to claim 13, wherein the oscillating includes:
determining, by the controller, the first value, the second value, the maintenance time period of the first value, and the maintenance time period of the second value, to adjust a value obtained by multiplying the maintenance time period of the first value by a difference between the calculated flow rate of fuel and the first value to be equal to a value obtained by multiplying the maintenance time period of the second value by a difference between the calculated flow rate of fuel and the second value.

16. The method according to claim 12, wherein the determining of whether the calculated flow rate of fuel is included in the first vibration generation range includes:
determining, by the controller, whether pulse width modulation (PWM) duty applied to the valve assembly is included in a second vibration generation range; and
determining, by the controller, that the calculated flow rate of fuel is included in the first vibration generation range in response to determining that the PWM duty is included in the second vibration generation range.

17. The method according to claim 16, wherein the oscillating includes:
oscillating, by the controller, the PWM duty to alternately have a third value that is equal to or greater than a upper limit value of the second vibration generation range and a fourth value that is equal to or less than a lower limit value of the second vibration generation range.

18. The method according to claim 16, wherein the oscillating includes:
determining, by the controller, at least one selected from the group consisting of: the third value, the fourth value, a maintenance time period of the third value, and a maintenance time period of the fourth value, to maintain the flow rate of the fuel at the same level as before oscillating the flow rate of the fuel.

19. The method according to claim 16, wherein the oscillating includes:
oscillating, by the controller, the PWM duty to alternately have the third value and the fourth value, in response to determining that the PWM duty is included in the second vibration generation range for a predetermined time period or more.

* * * * *